(12) United States Patent
Kim (10) Patent No.: US 8,868,816 B2
(45) Date of Patent: Oct. 21, 2014

(54) INTEGRATION CONNECTING APPARATUS IN MOBILE TERMINAL AND METHOD FOR OPERATING THE SAME

(75) Inventor: Kun Hee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 13/326,722

(22) Filed: Dec. 15, 2011

(65) Prior Publication Data

US 2012/0159036 A1    Jun. 21, 2012

(30) Foreign Application Priority Data

Dec. 17, 2010 (KR) ........................ 10-2010-0129833

(51) Int. Cl.
*G06F 13/10* (2006.01)
*G06F 13/40* (2006.01)
*G06F 13/38* (2006.01)
*H04R 1/10* (2006.01)

(52) U.S. Cl.
CPC .......... *G06F 13/4022* (2013.01); *G06F 13/385* (2013.01); *H04R 1/1041* (2013.01); *G06F 13/4068* (2013.01)
USPC ............... 710/316; 710/14; 710/63; 710/300; 710/104; 710/305; 381/74

(58) Field of Classification Search
USPC ........................................................ 710/316
See application file for complete search history.

(56) References Cited

U.S. PATENT DOCUMENTS

| | | | |
|---|---|---|---|
| 7,769,187 B1* | 8/2010 | Farrar et al. ..................... 381/74 |
| 7,836,216 B2* | 11/2010 | Kashi et al. ..................... 710/15 |
| 8,019,096 B2* | 9/2011 | Sander et al. .................. 381/123 |
| 8,111,841 B2* | 2/2012 | Ibe ................................. 381/107 |
| 8,219,729 B1* | 7/2012 | Wright .......................... 710/104 |
| 8,244,927 B2* | 8/2012 | Chadbourne et al. ........... 710/15 |
| 8,362,654 B2* | 1/2013 | Inha et al. ...................... 307/112 |
| 8,489,782 B2* | 7/2013 | Chadbourne et al. ........... 710/15 |
| 2003/0144040 A1* | 7/2003 | Liu et al. ........................ 455/568 |
| 2008/0270647 A1* | 10/2008 | Shih et al. ........................ 710/63 |
| 2008/0285776 A1* | 11/2008 | Wu et al. ........................ 381/114 |
| 2009/0180629 A1* | 7/2009 | Sander et al. .................... 381/58 |
| 2009/0180630 A1* | 7/2009 | Sander et al. .................... 381/58 |
| 2009/0180642 A1* | 7/2009 | Sander et al. .................. 381/109 |
| 2009/0180643 A1* | 7/2009 | Sander et al. .................. 381/111 |
| 2010/0169529 A1* | 7/2010 | Hsu et al. ....................... 710/300 |
| 2011/0093643 A1* | 4/2011 | Hung et al. .................... 710/316 |
| 2011/0099298 A1* | 4/2011 | Chadbourne et al. ........... 710/10 |
| 2011/0135109 A1* | 6/2011 | Park et al. ........................ 381/74 |
| 2012/0144072 A1* | 6/2012 | Hansson et al. ................ 710/15 |
| 2012/0265911 A1* | 10/2012 | Connolly ....................... 710/300 |
| 2013/0108063 A1* | 5/2013 | Verhoeve et al. ............... 381/58 |
| 2013/0108064 A1* | 5/2013 | Kocalar et al. .................. 381/58 |
| 2013/0216061 A1* | 8/2013 | Ma ................................... 381/74 |

* cited by examiner

*Primary Examiner* — Ryan Stiglic
(74) *Attorney, Agent, or Firm* — Jefferson IP Law, LLP (57) ABSTRACT

An apparatus and method for operating a connector of a mobile terminal are provided. The apparatus includes a connector including a plurality of pins, a plug of a peripheral device, a display unit for displaying a menu for setting a connector mode, an input unit for receiving selection of one connector mode from the menu for setting a connector mode, a main processor for connecting with a switch unit through a data line, a sound line, a microphone line, and a control line, for receiving connector mode selection information from the input unit, and for transferring switching information through the control line, and the switch unit for connecting with a subset of the pins of the connector, and selectively connecting the subset of the pins to at least one of the data line, the sound line, and the microphone line.

18 Claims, 12 Drawing Sheets

FIG. 7 the connector, and selectively connecting the subset of the pins to at least one of the data line, the sound line, and the microphone line according to the switching information received from the main processor.

In accordance with another aspect of the present invention, a method for operating a connector of a mobile terminal including a connector including a plurality of pins, a plug of a peripheral device being insertable into the connector, and a switch unit selectively connecting a subset of the pins to at least one of a data line, a sound line, and a microphone line, is provided. The method includes receiving selection of a menu for setting a connector mode by a user, displaying a connector mode list including a plurality of connector modes, receiving selection of one connector mode from the connector mode list by the user, and controlling the switch unit to open the subset of pins or to connect the subset of pins to at least one of the data line, the sound line, and the microphone line according the selected connector mode.

According to aspects of the present invention, only one connector having a small area is mounted in a mobile terminal, and thus a mounting space of a connector may be reduced. According to aspects of the present invention, a common 3.5 pi connector is used, and thus cost may be reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive

INTEGRATION CONNECTING APPARATUS IN MOBILE TERMINAL AND METHOD FOR OPERATING THE SAME

PRIORITY

This application claims the benefit under 35 U.S.C. §119 (a) of a Korean patent application filed on Dec. 17, 2010 in the Korean Intellectual Property Office and assigned Serial No. 10-2010-0129833, the entire disclosure of which is hereby incorporated by reference.

BACKGROUND OF THE INVENTION

1. Field of the Invention

The present invention relates to an integration connecting apparatus in a mobile terminal and a method for operating the same. More particularly, the present invention relates to an integration connecting apparatus in a mobile terminal connecting with various types of peripheral devices within a small mounting space, and a method for operating the same.

2. Description of the Related Art

In recent years, a mobile terminal has become increasingly popular. The mobile terminal may provide a voice call service, various data transmission services and various additional services, and may function as a multimedia communication device.

In general, the mobile terminal includes a 20 pin connector or a 24 pin connector for connection with a peripheral device, a first connector (3.5 pi connector) for listening to music or engaging in an earphone call, and a second connector for charging and data communication.

However, because the 20 pin connector or the 24 pin connector has a wide area, there is a need for a space for mounting the connector. In a case where a mobile terminal includes a connector for data communication as well as the 3.5 pi connector, there is need for a large space for mounting the connector.

SUMMARY OF THE INVENTION

Aspects of the present invention are to address at least the above-mentioned problems and/or to provide the advantages described below. Accordingly, an aspect of the present invention is to provide an integration connecting apparatus in a mobile terminal connecting with various types of peripheral devices within a small mounting space.

Another aspect of the present invention is to provide a method for operating an integration connecting apparatus in a mobile terminal connecting with various types of peripheral devices within a small mounting space.

In accordance with an aspect of the present invention, a mobile terminal is provided. The terminal includes a connector including a plurality of pins, a plug of a peripheral device being insertable into the connector, a display unit for displaying a menu for setting a connector mode; an input unit for receiving selection of one connector mode from the menu for setting a connector mode, a main processor for connecting with a switch unit through a data line, a sound line, a microphone line, and a control line, for receiving connector mode selection information from the input unit, and for transferring switching information corresponding to the selected connector mode to the switch unit through the control line, and the switch unit for connecting with a subset of the pins of the connector, and selectively connecting the subset of the pins to understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile terminal according to exemplary embodiments of the present invention may be implemented with an information and communication device and a multimedia device, such as a Portable Multimedia Player (PMP), a Personal Digital Assistant (PDA), a Smart Phone, and a Moving Picture Experts Group (MPEG)-1 or MPEG-2 Audio Layer 3 (MP3) player.

Figure 1:
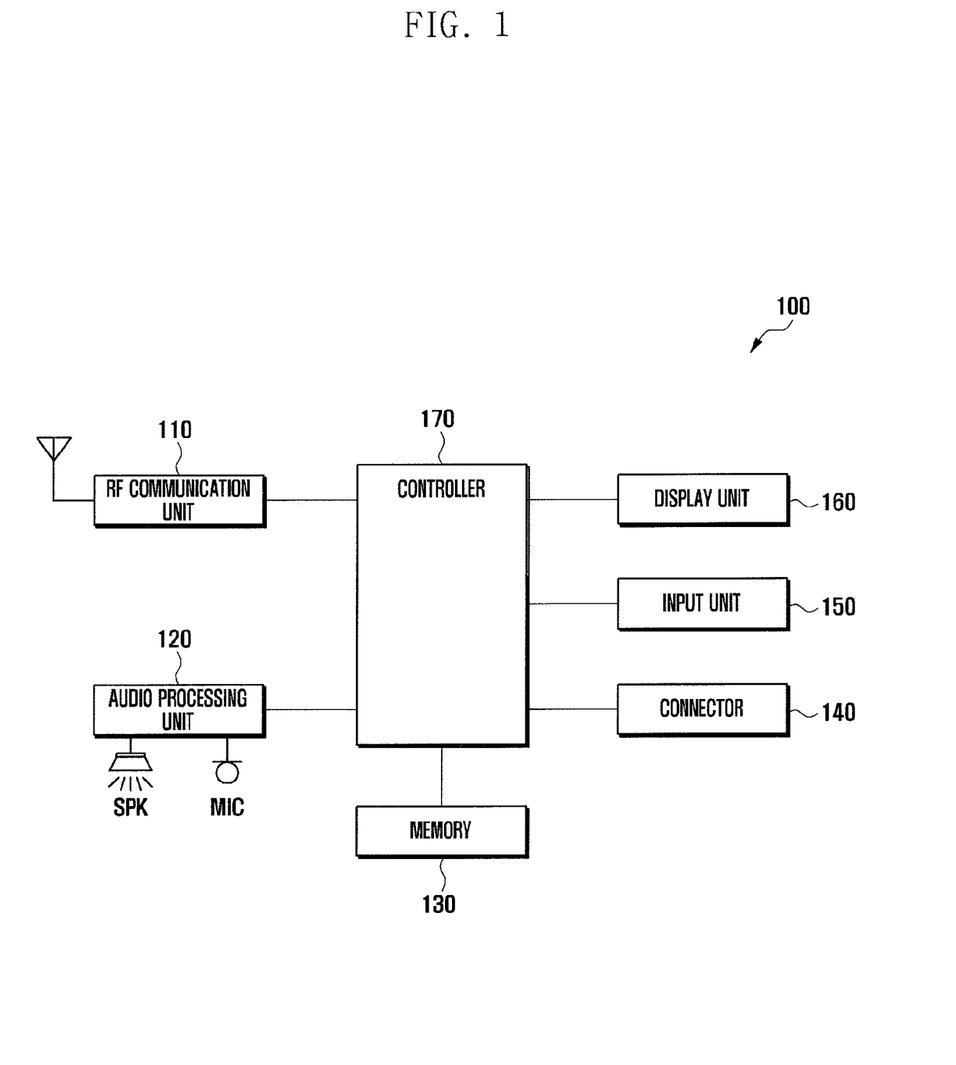
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention. The mobile terminal 100 includes a Radio Frequency (RF) communication unit 110, an audio processing unit 120, a memory 130, a connector 140, an input unit 150, a display unit 160, and a controller 170. According to exemplary embodiments of the present invention, the mobile terminal 100 may include additional and/or different components, or omit any number of the components shown in FIG. 1. Similarly, the functionality of two or more components may be integrated into a single component.

Referring to FIG. 1, the RF communication unit 110 transmits and receives data for radio communication of the mobile terminal 100. The RF communication unit 110 may include an RF transmitter for up-converting a frequency of a transmit signal and for amplifying the signal, and an RF receiver for low-noise-amplifying a received signal and for down-converting the signal. Further, the RF communication unit 110 receives and outputs data through an RF channel to the controller 170. The RF communication unit 110 may transmit data output from the controller 170 through the RF channel. The audio processing unit 120 may be implemented with a CODEC. The CODEC may include a data CODEC for processing packet data and an audio CODEC for processing an audio signal such as speech. The audio processing unit 120 converts a digital audio signal into an analog audio signal through the audio CODEC and plays the analog audio signal through a speaker (SPK). The audio processing unit 120 converts an analog audio signal input from a microphone (MIC) into a digital audio signal.

The memory 130 stores programs and data used for operations of the mobile terminal 100. The memory 130 may be divided into a program area and a data area. The program area may store an Operating System (OS) for controlling an overall operation the mobile terminal 100 and for booting the portable terminal 100, and application programs used for playing multimedia contents or performing other functions of the mobile terminal 100, for example, a camera function, a sound playing function, and an image or moving image playing function. The data area may store data created according to a use of the mobile terminal 100, for example, images, moving images, phone-books, or audio data. The memory 130 may store programs and data regarding a menu for setting a connector mode.

A plug of a peripheral device is inserted into a connector 140. The connector 140 provides paths for Universal Serial Bus (USB) communication and Universal Asynchronous Receiver/Transmitter (UART) communication of the peripheral device, an earphone function, an ear microphone function, a power charging function, and an antenna function. It is preferred that the connector 140 is a 3.5 pi 4-pole connector. However, the present invention is not limited thereto. The connector 140 may be a circular connector having a diameter (e.g., 2.5 mm) different from 3.5 pi. Exemplary embodiments of the present invention are described based on a 4-pole connector. However, the present invention is not limited thereto. The present invention is also applicable to a 3-pole connector, a 5-pole connector, etc. A first pin of the connector 140 may be used to sense insertion of a plug of the peripheral device and provide a charge power. A second pin and a third pin may be used for a data communication function, an earphone function, and a microphone function. A fourth pin may be used for a ground (GND) and an antenna function. The first pin is fixedly connected to a power supply and the fourth pin is fixedly connected to the ground.

The input unit 150 receives and transfers a key operation signal of a user for controlling the mobile terminal 100 to the controller 170. The input unit 150 may be implemented with a keypad such as a 3*4 keypad or a QWERTY keypad including a numeral key, a character key, and an arrow key or a touch panel. Besides these, the input unit 150 may be implemented with a button key, a jog key, and a wheel key. The input unit 150 generates and transfers an input signal for executing applications (e.g., a call function, a music playing function, a moving image playing function, an image display function, a camera photographing function, a Digital Multimedia Broadcasting (DMB) output function) of the mobile terminal 100 to the controller 170.

The display unit 160 may be implemented with a Liquid Crystal Display (LCD), an Organic Light Emitting Diode (OLED), an Active Matrix Organic Light Emitting Diode (AMOLED), etc. The display unit 160 visibly provides a menu of the mobile terminal 100, input data, function setting information, and various other information. The display unit 160 outputs a booting screen, an idle screen, a menu screen, a call screen, and other application screens of the mobile terminal 100.

The controller 170 controls an overall operation with respect to respective structural elements of the mobile terminal 100. A construction of the controller 170 of the present invention will be described below with reference to FIG. 2.

Figure 2:
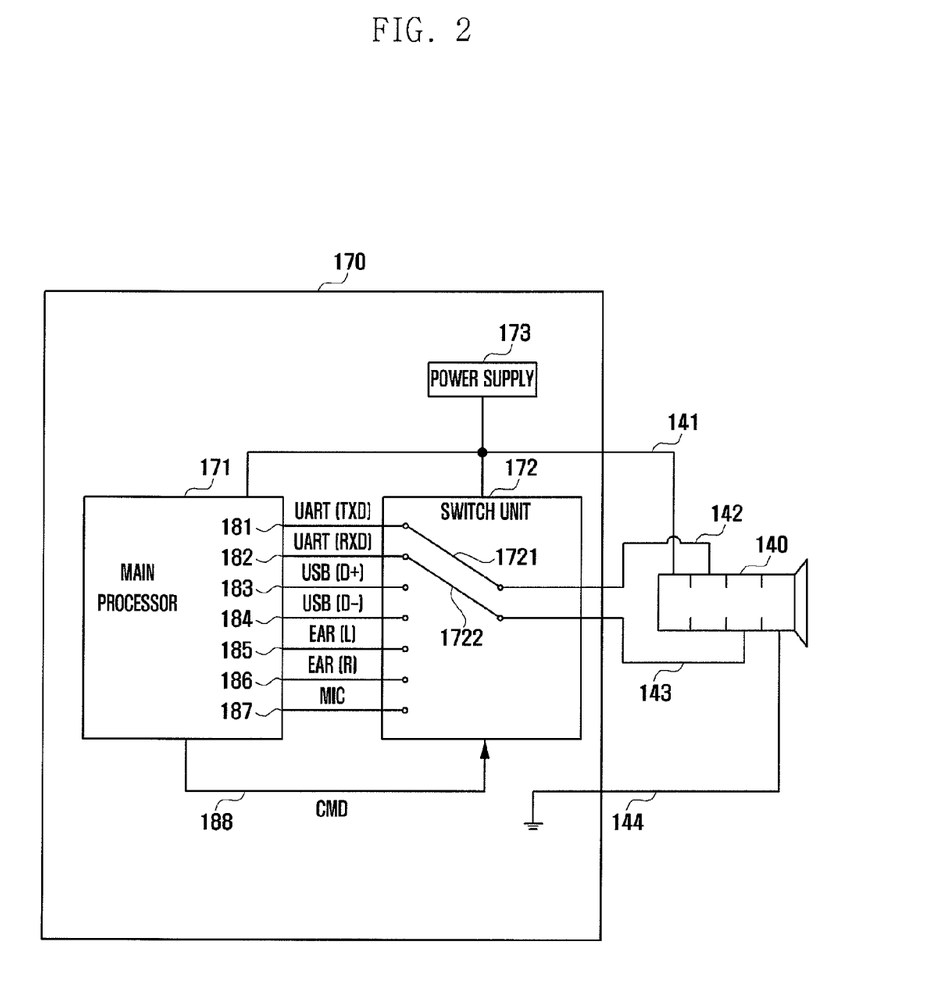
FIG. 2 is a view illustrating a connection relationship between an internal construction of a controller and a connector according to an exemplary embodiment of the present invention.

FIG. 2 is a view illustrating a connection relationship between an internal construction of a controller and a connector according to an exemplary embodiment of the present invention.

The controller 170 according to an exemplary embodiment of the present invention includes a main processor 171, a switch unit 172, and a power supply 173. According to exemplary embodiments of the present invention, the controller 170 may include additional and/or different components, or omit any number of the components shown in FIG. 2. Similarly, the functionality of two or more components may be integrated into a single component.

The main processor 171 controls an overall operation of the mobile terminal 100. The main processor 171 controls the switch unit 172 according to a signal received from the input unit 150. The main processor 171 connects with the switch unit 172 through a UART (TXD) line 181, a UART(RXD) line 182, a USB(D+) line 183, a USB(D−) line 184, an EAR (L) line 185, an EAR(R) line 186, an MIC line 187, and a CMD line 188. The UART(TXD) 181 is a transmission line of a UART communication, the UART(RXD) line 182 is a receiving line of the UART communication, the USB(D+) line 183 is a data (+) line of a USB communication, the USB(D−) line 184 is a data(−) line of the USB communication, the EAR(L) line 185 is a left sound line of an earphone function, the EAR(R) line 186 is a right sound line of the earphone function, the MIC line 187 is a line of a microphone function, and the CMD line 188 is a line for communicating a control signal for controlling the switch unit 172.

The switch unit 172 connects with the main processor 171 through the UART(TXD) line 181, the UART(RXD) line 182, the USB(D+) 183, the USB(D−) line 184, the EAR(L) line 185, the EAR(R) line 186, the MIC line 187, and the CMD line 188. The switch unit 172 moves a switch according to a control signal received from the CMD line 188. The switch unit 172 connects with a second pin of the connector 140 through the second pin line 142. The switch unit 172 connects with a third pin of the connector 140 through the third pin line 143. A first switch 1721 and a second switch 1722 are located at an end of the second pin line 142 and an end of the third pin line in the switch unit 172, respectively.

The switch unit 172 moves the first switch 1721 and the second switch 1722 with the first switch 1721 and the second switch 1722 so as to be in contact with the UART(TXD) line 181, the UART(RXD) line 182, the USB(D+) line 183, the USB(D−) line 184, the EAR(L) line 185, the EAR(R) line 186, or the MIC line 187 or without contacting any of the lines to open the first switch 1721 and the second switch 1722.

The power supply 173 generates a voltage for driving the mobile terminal 100, and connects with the main processor 171, the switch unit 172, and a first pin of the connector 140. The power supply 173 connects with the first pin of the connector 140 through the first pin line 141.

The connector 140 shown in FIG. 2 is a 4-pole connector. A first pin, a second pin, a third pin, and a fourth pin are formed from the left side to the right side. The first pin 141 connects with the power supply 173 through the first pin line 141. The second pin and the third pin connect with the switch unit 172 through the second pin line 142 and the third pin line 143, respectively. The fourth pin connects with a ground (GND) 144.

The main processor 171 determines whether a menu for setting a connector mode is selected though the input unit 150. If the menu for setting a connector mode is selected, the main processor 171 controls the display unit 160 to display a connector mode list composed of a charging mode, a USB mode, a UART mode, an antenna mode, an earphone mode, and an ear mode. If it is recognized that one connector mode is selected from the input unit 150, the main processor 171 controls the switch unit 172 according to the selected connector mode. If the charging mode or the antenna mode is selected as the connector mode, the main processor 171 controls the switch unit 172 to open a second pin and a third pin of the connector 140. That is, the switch unit 172 controls the first switch 1721 and the second switch 1722 to not be in contact with any of lines 181 to 187. If the USB mode is selected as the connector mode, the main processor 171 controls the switch unit 172 to connect the first switch 1721 to the USB(D+) line 183 and connect the second switch 1722 to the USB(D−) LINE 184. Meanwhile, if the UART mode is selected as the connector mode, the main processor 171 controls the switch unit 172 to connect the first switch 1721 to the UART(TXD) line 181 and connect the second switch 1722 to the UART(RXD) line 182.

If the earphone mode is selected as the connector mode, the main processor 171 controls the switch unit 172 to connect the first switch 1721 to the EAR(L) line 185 and to connect the second switch 1722 to the EAL(R) line 186. If the ear microphone mode is selected as the connector mode, the main processor 171 controls the switch unit 172 to connect the first switch 1721 with the EAR(R) line 186 and to connect the second switch 1722 to the MIC line 187.

In an exemplary embodiment of the present invention, the main processor 171 determines whether the mobile terminal 100 is in a power on state. If the mobile terminal 100 is in the power on state, the main processor 171 sets a connector mode to an earphone mode and controls the switch unit 172 to connect the first switch 1721 to an EAR(L) line 185 and to connect the second switch 1722 to an EAR(R) line 186. If the mobile terminal 100 is in a power off state, the main processor 171 may set the connected mode to a charging mode and control the switch unit 172 to open the first switch 1721 and the second switch 1722. Further, the main processor 171 determines whether a radio function is executed through an input unit 150. If the radio function is executed, the main processor 171 may set the connector mode to an antenna mode and control the switch unit 172 to open the first switch 1721 and the second switch 1722.

The foregoing exemplary embodiment has illustrated an internal configuration of the mobile terminal 100 according to an exemplary embodiment of the present invention. Hereinafter, a method for operating the mobile terminal 100 is described.

Figure 3:
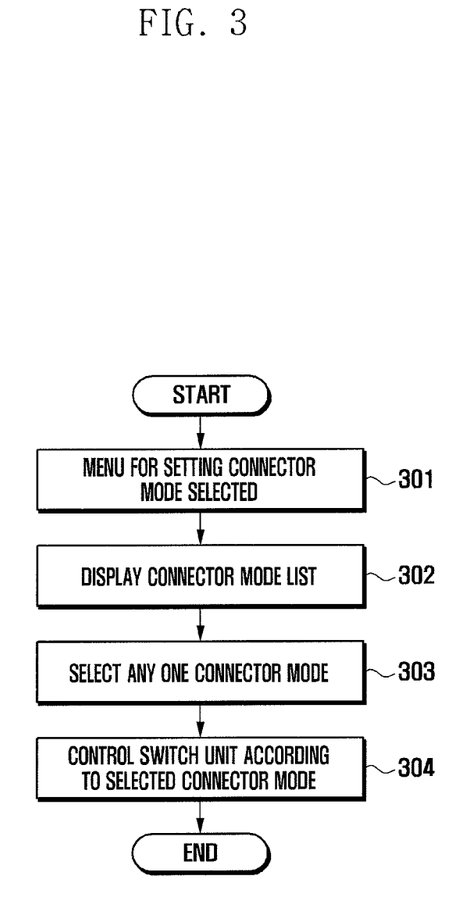
FIG. 3 is a flowchart illustrating a method for operating a mobile terminal according to an exemplary embodiment of the present invention.

FIG. 3 is a flowchart illustrating a method for operating a mobile terminal according to an exemplary embodiment of the present invention.

A main processor 171 determines whether a menu for setting a connector mode is selected through an input unit 150 in step 301. If the main processor 171 recognizes selection input of a main menu of a user through an input unit 150, the main processor 171 may control the display unit 160 to display a main menu list. In this case, a 'connector mode set' menu may be included in the main menu list.

Figure 4A:
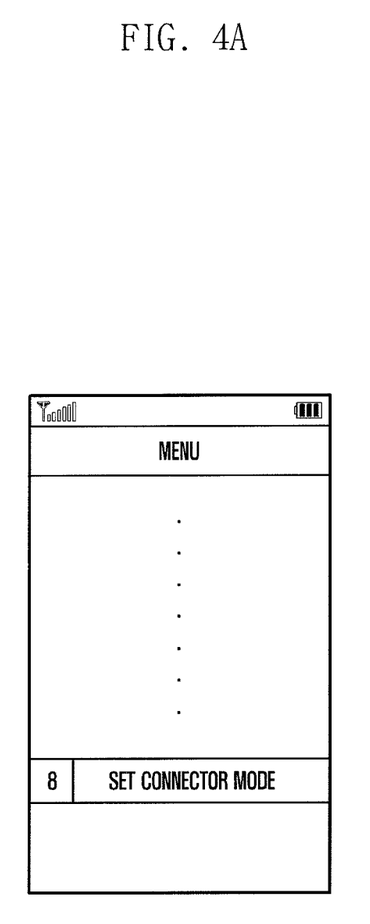
FIGS. 4A and 4B are views illustrating examples of a screen displayed at a time of setting a connector mode according to an exemplary embodiment of the present invention.
Figure 4B:
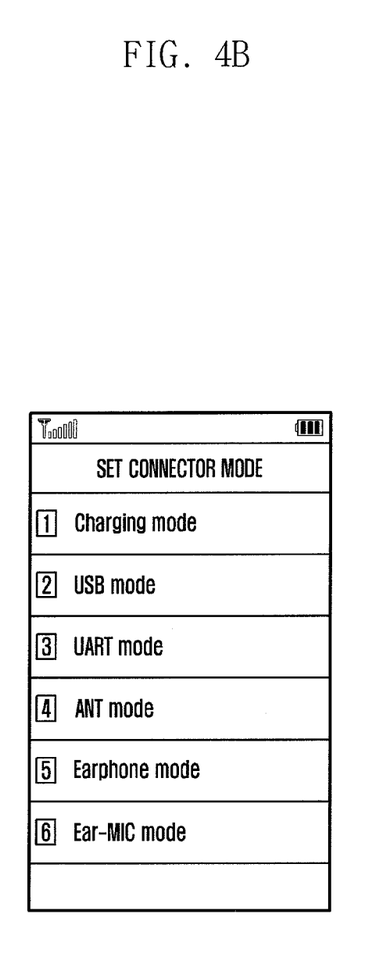

FIGS. 4A and 4B are views illustrating examples of a screen displayed at a time of setting a connector mode according to an exemplary embodiment of the present invention.

Referring to FIG. 4A, a main menu list including the 'connector mode set' menu is shown.

If the menu for setting a connector mode is selected through the input unit 150, the main processor 171 controls the display unit 160 to display a connector mode list in step 302. The connector mode list of an exemplary embodiment of the present invention may include a charging mode, a USB mode, a UART mode, an antenna (ANT) mode, an earphone mode, and ear-microphone (MIC) mode. In an exemplary embodiment of the present invention, the antenna mode may be divided into a general antenna mode and an earphone combined mode.

Referring to FIG. 4B, an example of a screen of a connector mode list is shown. The connector mode list is composed of a charging mode, a USB mode, a UART mode, an antenna mode, an earphone mode, and an ear-microphone mode.

The main processor 171 recognizes that any one connector mode is selected through the input unit 150 in step 303. A user selects any one connector mode using the input unit 150 while viewing the connector mode list, and the main processor 171 recognizes a connector mode selected by the user based on a signal received from the input unit 150.

Next, the main processor 171 controls the switch unit 172 according to the selected connector mode in step 304. The main processor 171 transmits a control signal to the switch unit 172 through a CMD line 172, and the switch unit 172 moves the control signal received from the main processor 171 to the first switch 1721 and the second switch 1722. If it is recognized that a charging mode or an antenna mode is selected as the connector mode, the main processor 171 controls the switch unit 172 to open a second pin and a third pin of the connector 140. Because only a power pin (first pin) and a ground pin (fourth pin) are used in a charging mode, the switch unit 172 changes the second pin and the third pin regarding data communication and speech communication to an open state. An antenna mode is a mode using an earphone cable as an antenna, and may be divided into a general antenna mode and an antenna/earphone mode. Because only a power pin (first pin) and a ground pin (fourth pin) are used in the general antenna mode, the switch unit 172 changes the second pin and the third pin to the open state. However, the switch unit may connect the first switch 1721 to an EAR(L) line 185 for speech communication in an antenna/earphone mode using both of the antenna mode and the earphone mode, and connect the second switch 1722 to an EAR(R) line 186.

FIGS. 6A to 6E are views illustrating modified forms of a switch unit based on selection of a connector mode according to an exemplary embodiment of the present invention.

Figure 6A:
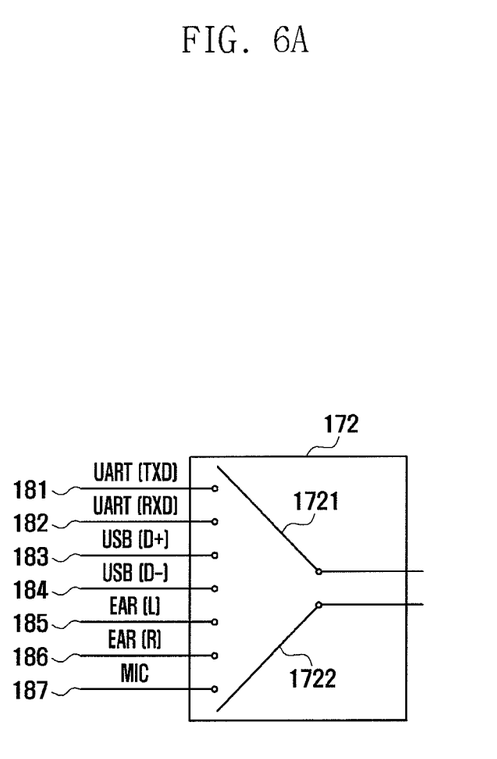
FIGS. 6A to 6E are views illustrating modified forms of a switch unit based on selection of a connector mode according to an exemplary embodiment of the present invention.

Referring to FIG. 6A, a form of the switch unit 172 when a charging mode or an antenna mode is selected as the connector mode is shown. In FIG. 6A, a first switch 1721 and a second switch 1722 do not contact with lines 181 to 187 and are thus open.

Figure 6B:
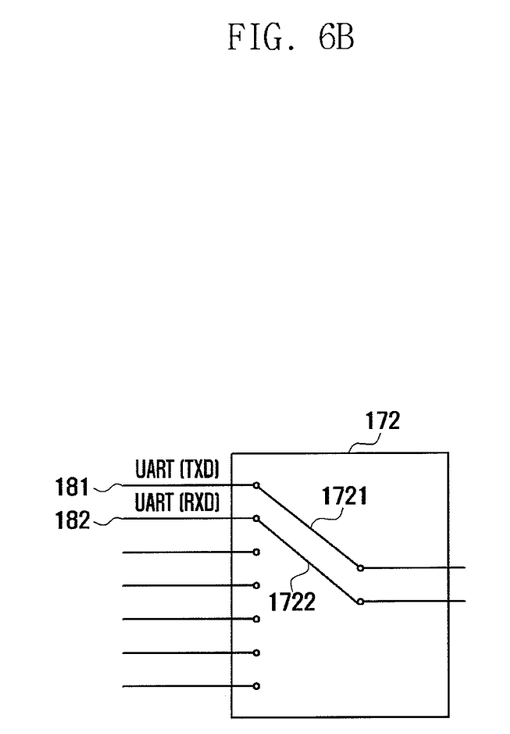
Figure 6C:
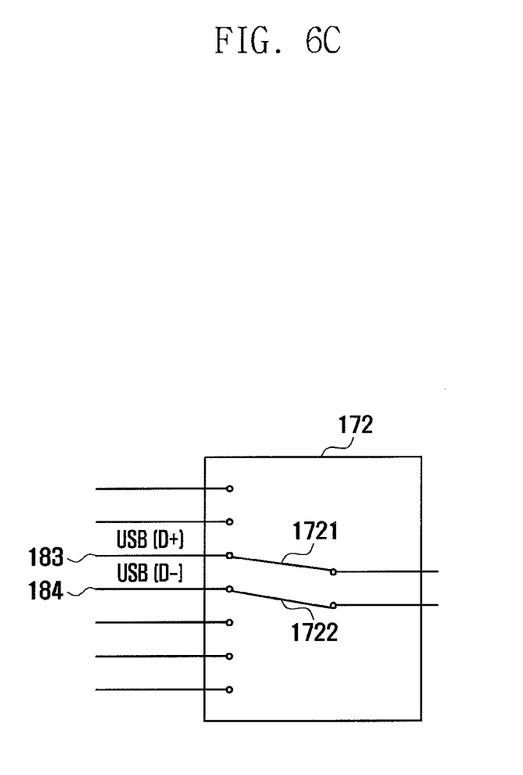

If it is recognized that a USB mode is selected as the connector mode, the main processor 171 controls the switch unit 172 to connect the first switch 1721 to a USB(D+) line 183, and connect the second switch 1722 to a USB(D−) line 184. If it is recognized that a UART mode is selected as the connector mode, the main processor 171 controls the switch unit 172 to connect the first switch 1721 to UART(TXD) line 181 and connect the second switch 1722 to a UART(RXD) line 182. A USB mode and a UART mode are a data communication mode, and a connector 140 becomes a path for communicating data. A second pin and a third pin are connected to a USB(D+) line 183 and a USB(D−) line 184 or a UART (TXD) line 181 and a UART(RXD) line 182, respectively, to function as a path for communicating data.

Referring to FIG. 6B, a form of the switch unit 172 when a UART mode is selected as the connector mode is shown. In FIG. 6B, a first switch 1721 and a second switch 1722 connect with a UART(TXD) line 181 and a UART(RXD) line 182, respectively.

Referring to FIG. 6C, a form of the switch unit 172 when a USB mode is selected as the connector mode is shown. In FIG. 6C, a first switch 1721 and a second switch 1722 connect with a USB(D+) line 183 and a USB(D−) line 184, respectively.

Figure 6D:
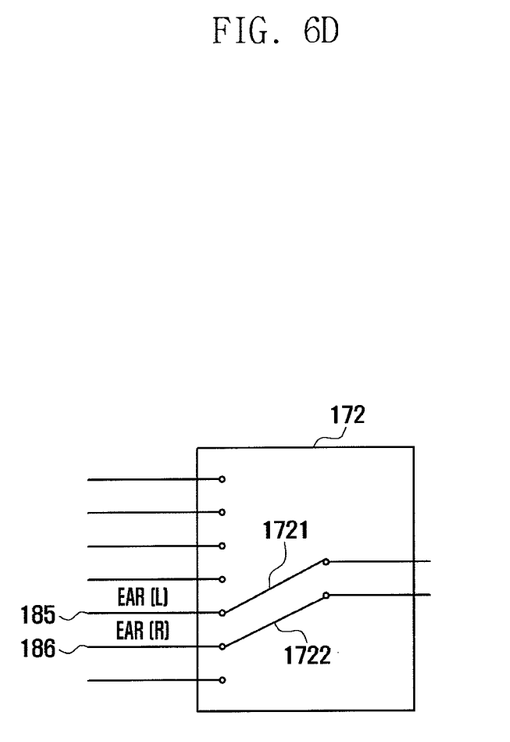

If it is recognized that an earphone mode is selected as a connector mode, the main processor 171 controls the switch unit 172 to connect the first switch 1721 to an EAR(L) line 185 and to connect the second switch 1722 to an EAR(R) line 186. The earphone mode is a speech communication mode, and the connector 140 becomes a path for speech output from the main processor 171. A second pin and a third pin are connected with an EAR(L) line 185 and an EAR(R) line 186 to function as a path for speech, respectively.

Figure 6E:
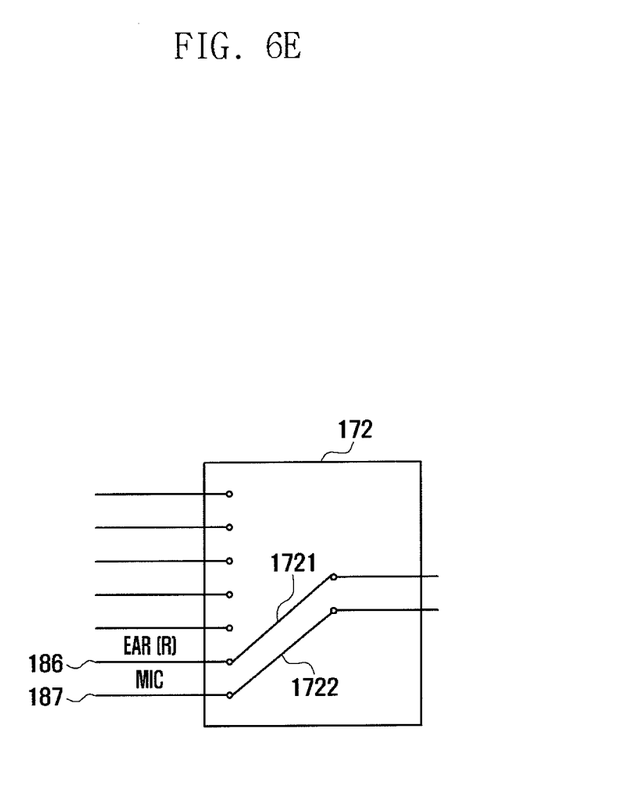

If it is recognized that an ear microphone mode is selected as the connector mode, the main processor 171 controls the switch unit 172 to connect the first switch 1721 to an EAR(R) line 186 and to connect the second switch 1722 to an MIC line 187. The ear microphone mode is also a speech communication mode, and the connector 140 becomes a path for speech input to a microphone of an ear-jack and a speech output from the main processor 171. A second pin and a third pin are connected with an EAR(L) line 185 and an EAR(R) line 186 to function as a path for speech, respectively. In an exemplary embodiment of the present invention, the second pin and the third pin may be connected to the EAR(L) line 185 and the MIC line 187, respectively.

Referring to FIG. 6D, a form of the switch unit 172 when an earphone mode is selected as the connector mode is shown. In FIG. 6D, a first switch 1721 and a second switch 1722 are connected to an EAR(L) 185 and an EAR(R) line 186, respectively.

Referring to FIG. 6E, a form of the switch unit 172 when an ear microphone mode is selected as the connector mode is shown. In FIG. 6E, a first switch 1721 and a second switch 1722 are connected to an EAR(R) 186 and a MIC line 187, respectively.

In an exemplary embodiment of the present invention, if a user selects a connector mode, a line connected to the second pin and the third pin of the connector 140 changes according to selected information of a user such that the connector 140 may selectively use one of a data communication function, a speech communication function, a charging function, or an antenna function.

Figure 5:
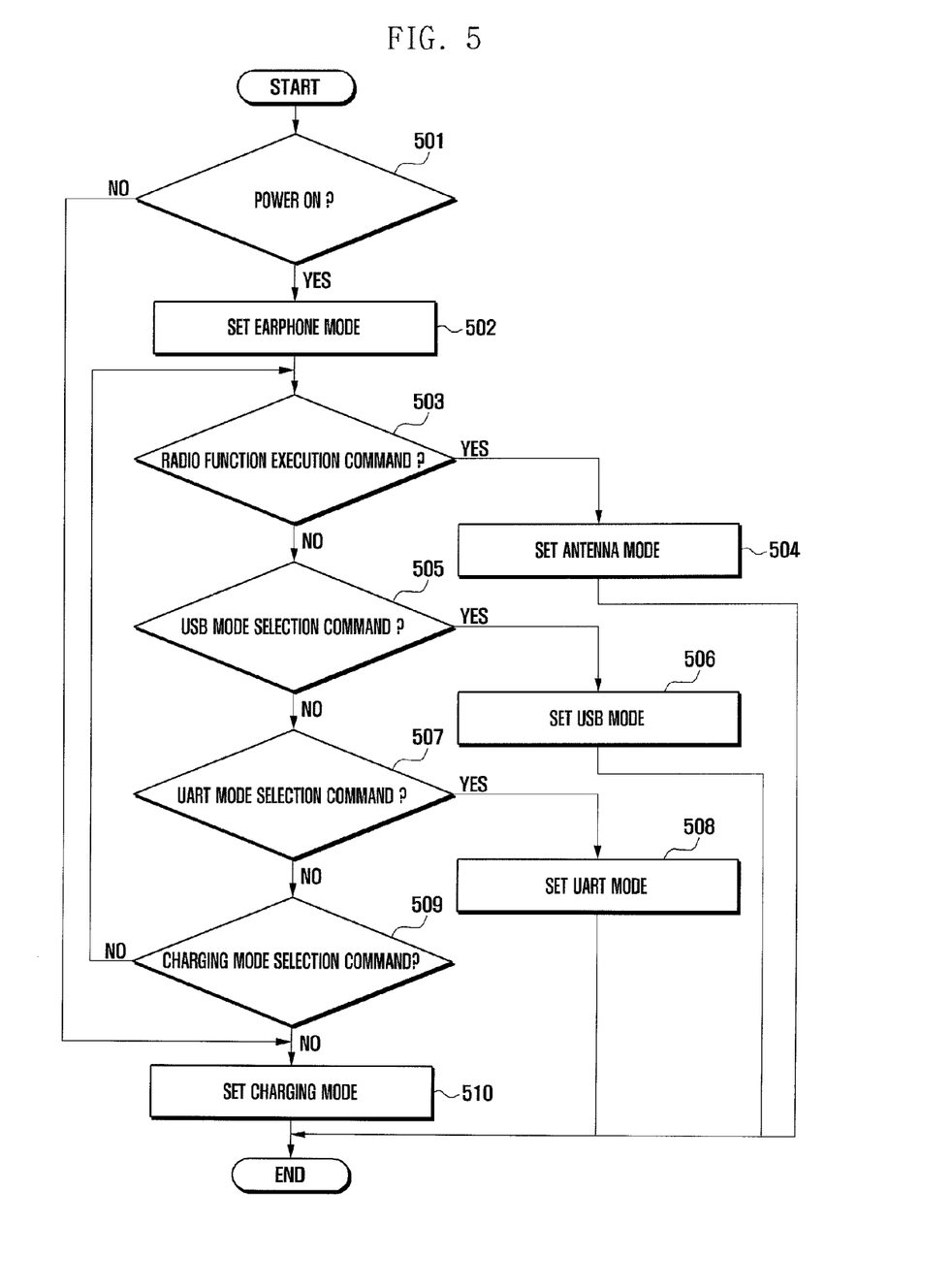
FIG. 5 is a flowchart illustrating a method for operating a mobile terminal according to another exemplary embodiment of the present invention.

FIG. 5 is a flowchart illustrating a method for operating a mobile terminal according to another exemplary embodiment of the present invention.

The main processor 171 determines whether the mobile terminal 100 is in a power on state in step 501. If the mobile terminal 100 is not in the power on state, the main processor 171 proceeds to step 510, which is described further below. In contrast, if the mobile terminal 100 is in the power on state, the main processor 171 sets a connector mode to an earphone mode in step 502. The main processor 171 controls a switch unit 172 to connect a first switch 1721 to an EAR(L) line 185 and to connect a second switch 1722 to an EAR(R) line 186.

The main processor 171 determines whether a radio function execution command is input in step 503. In this case, a user inputs a radio application execution command through an input unit 150, and a main processor 171 may determine whether a radio function execution command is input based on a signal received from the input signal.

When the radio function execution command is input, the main processor 171 executes a radio function to set the connector mode to an antenna mode in step 504. The main processor 171 controls a switch unit 1721 to open the first switch 1721 and the second switch 1722. Thereafter, the main processor 171 ends the process according to an exemplary embodiment of the present invention.

If the radio function execution command is not input at step 503, the main processor 171 determines whether a USB mode selection command is input by a user through the input unit 150 in step 505. A user may select a menu for setting a connector mode and select a USB mode in a connector mode list. When the USB mode selection command is input, the main processor 171 sets a connector mode to a USB mode in step 506. The main processor 171 controls the switch unit 172 to connect a first switch 1721 to a USB(D+) line 183 and to connect a second switch 1722 to a USB(D−) line 184. Thereafter, the main processor 171 ends the process according to an exemplary embodiment of the present invention.

If the USB mode selection command is not input by a user at step 505, the main processor 171 determines whether a UART mode selection command is input by a user in step 507. A user may select a menu for setting a connector and select a UART mode from a connector mode list. When the UART mode selection command is input, the main processor 171 sets the connector mode to a UART mode in step 508. The main processor 171 controls the switch unit 172 to connect the first switch 1721 to a UART(TXD) line 181 and to connect the second switch 1722 to a UART(RXD) line 182. Thereafter, the main processor 171 ends the process according to an exemplary embodiment of the present invention.

If the UART mode selection command is not input by a user at step 507, the main processor 171 determines whether a charging mode selection command is input by a user in step 509. A user may select a menu for setting a connector mode and select a charging mode from a connector mode list. When the charging mode selection command is input, the main processor 171 sets the connector mode to a charging mode in step 510. The main processor 171 controls the switch unit 172 to open the first switch 1721 and the second switch 1722. Thereafter, the main processor 171 ends the process according to an exemplary embodiment of the present invention.

When the charging mode selection command is not input by a user at step 509, the main processor 171 determines whether a radio function execution command occurs in step 503 and performs the foregoing procedures.

If the mobile terminal 100 is in a power off state at step 501, the main processor 171 sets the connector mode to a charging mode, and controls the switch unit 172 to open the first switch 1721 and the second switch 1722.

Figure 7:
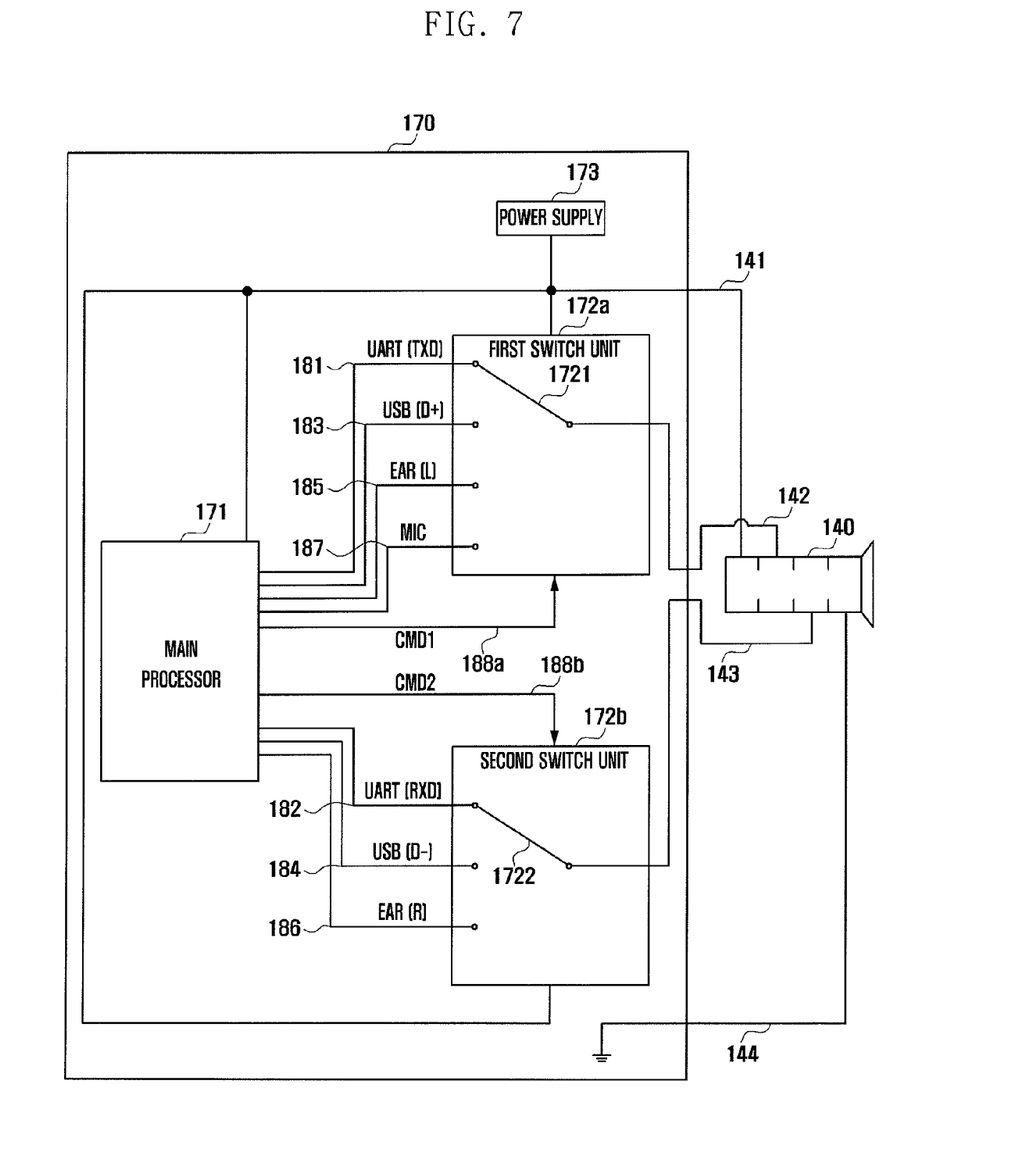
FIG. 7 is a view illustrating a connection relationship between an internal construction of a controller and a connector according to another exemplary embodiment of the present invention.

FIG. 7 is a view illustrating a connection relationship between an internal construction of a controller and a connector according to another exemplary embodiment of the present invention. In FIG. 7, the controller 170 includes two switch units.

The controller 170 according to another exemplary embodiment of the present invention includes a main processor 171, a first switch unit 172a, a second switch unit 172b, and a power supply 173. According to exemplary embodiments of the present invention, the controller 170 may include additional and/or different components, or omit any number of the components shown in FIG. 7. Similarly, the functionality of two or more components may be integrated into a single component.

The main processor 171 connects with the first switch unit 172a through a UART(TXD) line 181, a USB(D+) line 183, an EAR(L) line 185, an MIC line 187, and a CMD 1 line 188a. The main processor 171 connects with the second switch unit 172b through a UART(RXD) line 182, a USB(D−) line 184, an EAR(R) line 186, and a CMD 2 line 188b.

The CMD 1 line 188a is a line for communicating a control signal for controlling the first switch unit 172a. The CMD 2 line 188b is a line for communicating a control signal for controlling the second switch unit 172b.

The first switch unit 172a connects with a second pin of the connector 140 through a second pin line 142, and the second switch unit 172b connects with a third pin of the connector 140 through a third pin line 143. A first switch 1721 is located at an end of a second pin line 142 in the first switch unit 172a. A second switch 1722 is located at an end of a third pin line 143 in the second switch unit 172b. The first switch unit 172a may move the first switch 1721 so as to be in contact with one of the UART(TXD) line 181, the USB(D+) line 183, the EAR(L) line 185, or the MIC line 187 or to open the first switch 1721. Further, the second switch unit 172b may moves the second switch 1722 so as to be in contact with one of the UART(RXD) line 182, the USB(D−) line 184, or the EAR(R) line 186 or to open the second switch 1722.

The power supply 173 connects with the main processor 171, the first switch unit 172a, the second switch unit 172b, and a first pin of the connector 140, and supplies power to them. A fourth pin may be used for a ground (GND) 144 and may be used for an antenna function.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal, comprising:
 a connector including a plurality of pins, a plug of a peripheral device being insertable into the connector;
 a display unit configured to display a menu for setting a connector mode, including a charging mode, a Universal Serial Bus (USB) mode, a Universal Asynchronous Receiver/Transmitter (UART) mode, an antenna mode, an earphone mode, and an ear microphone mode;
 an input unit configured to receive selection of one connector mode from the menu for setting a connector mode;
 a main processor configured to connect with a switch unit through a data line, a sound line, a microphone line, and a control line, to receive connector mode selection information from the input unit, and to transfer switching information corresponding to the selected connector mode to the switch unit through the control line; and
 the switch unit configured to connect with a subset of the pins of the connector, and to selectively connect the subset of the pins to at least one of the data line, the sound line, and the microphone line according to the switching information received from the main processor,
 wherein the plurality of pins includes two pins configured to be connectable to the data line and one pin configured to be a ground pin performing an antenna function.

2. The mobile terminal of claim 1, wherein the connector is a 3.5 pi 4-pole connector.

3. The mobile terminal of claim 2, wherein a first pin of the connector connects with a power supply, a second pin and a third pin of the connector connect with the switch unit, and a fourth pin of the connector connects with a ground.

4. The mobile terminal of claim 3, wherein the data line comprises a USB(D+) line, a USB(D−) line, a UART(transmission) line, and a UART(reception) line, and the sound line comprises a left earphone line (EAR L) and a right earphone line (EAR R).

5. The mobile terminal of claim 4, wherein the main processor transfers switching information for opening the second pin and the third pin to the switch unit when the charging mode or the antenna mode is selected.

6. The mobile terminal of claim 4, wherein the main processor transfers switching information for connecting the second pin to the USB(D+) line and connecting the third pin to the USB(D−) line to the switch unit when the USB mode is selected.

7. The mobile terminal of claim 4, wherein the main processor transfers switching information for connecting the second pin to the UART(transmission) line and connecting the third pin to the UART(reception) line to the switch unit when the UART mode is selected.

8. The mobile terminal of claim 4, wherein the main processor transfers switching information for connecting the second pin to the right earphone line (EAR R) and connecting the third pin to the left earphone line (EAR L) when the earphone mode is selected.

9. The mobile terminal of claim 4, wherein the main processor transfers switching information for connecting the second pin to the right earphone line (EAR R) and connecting the third pin to the left earphone line (EAR L) when the ear microphone mode is selected.

10. The mobile terminal of claim 1, wherein the switch unit comprises two switch units.

11. A method for operating a connector of a mobile terminal including a connector including a plurality of pins, a plug of a peripheral device being insertable into the connector, and a switch unit selectively connecting a subset of the pins to at least one of a data line, a sound line, and a microphone line, the method comprising:
  receiving selection of a menu for setting a connector mode by a user;
  displaying a connector mode list including a plurality of connector modes, including a charging mode, a Universal Serial Bus (USB) mode, a Universal Asynchronous Receiver/Transmitter (UART) mode, an antenna mode, an earphone mode, and an ear microphone mode;
  receiving selection of one connector mode from the connector mode list by the user; and
  controlling the switch unit to open the subset of pins or to connect the subset of pins to at least one of the data line, the sound line, and the microphone line according the selected connector mode,
  wherein the plurality of pins includes two pins configured to be connectable to the data line and one pin configured to be a ground pin performing an antenna function.

12. The method of claim 11, further comprising:
  determining whether the mobile terminal is in a power on mode;
  setting the connector mode to the earphone mode when the mobile terminal is in the power on mode; and
  setting the connector mode to the charging mode when the mobile terminal is in a power off mode.

13. The method of claim 11, further comprising:
  determining whether an execution command of a radio function of the mobile terminal is input; and
  setting the connector mode to the antenna mode when the execution command of a radio function of the mobile terminal is input.

14. The method of claim 11, wherein the data line comprises a USB(D+) line, a USB(D−) line, a UART(transmission) line, a UART(reception) line, the sound line comprises a left earphone line (EAR L) and a right earphone line (EAR R).

15. The method of claim 14, wherein the connector comprises four pins, a first pin of the connector connects with a power supply, a second pin and a third pin of the connector connect with the switch unit, and a fourth pin of the connector connects with a ground.

16. The method of claim 15, wherein the controlling of the switch unit comprises controlling the switch unit:
  to open the second pin and the third pine when the charging mode or the antenna mode is selected;
  to connect the second pint to the USB(D+) line and connect the third pin to the USB(D−) line when the USB mode is selected;
  to connect the second pin to the UART(transmission) line and connect the third pin to the UART(reception) line when the UART mode is selected;
  to connect the second pin to the left earphone line (EAR L) and connect the third pin to the right earphone line (EAR R) when the earphone mode is selected; and
  to connect the second pin to the right earphone line (EAR R) and connector the third pin to the microphone line when the ear microphone mode is selected.

17. The method of claim 11, wherein the switch unit comprises two switch units.

18. The method of claim 11, wherein the connector is a 3.5 pi 4-pole connector.

* * * * *